(12) United States Patent
Imai et al.

(10) Patent No.: US 7,943,230 B2
(45) Date of Patent: May 17, 2011

(54) EASY TEAR BIAXIALLY STRETCHED POLYESTER BASED FILM

(75) Inventors: Kazumoto Imai, Inuyama (JP); Naonobu Oda, Inuyama (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 930 days.

(21) Appl. No.: 11/579,068

(22) PCT Filed: Apr. 26, 2005

(86) PCT No.: PCT/JP2005/007917
§ 371 (c)(1),
(2), (4) Date: Mar. 1, 2007

(87) PCT Pub. No.: WO2005/015440
PCT Pub. Date: Nov. 10, 2005

(65) Prior Publication Data
US 2008/0213577 A1    Sep. 4, 2008

(30) Foreign Application Priority Data
Apr. 30, 2004   (JP) ................. 2004-136435

(51) Int. Cl.
*B32B 7/00* (2006.01)
*B32B 7/02* (2006.01)
*B32B 27/08* (2006.01)
*B32B 27/18* (2006.01)
*B32B 27/36* (2006.01)

(52) U.S. Cl. ........ 428/212; 428/327; 428/480; 428/910; 525/88; 525/92 F; 525/165; 525/173; 525/174; 525/437

(58) Field of Classification Search ........................ None
See application file for complete search history.

(56) References Cited

U.S. PATENT DOCUMENTS

| 4,965,307 | A | * | 10/1990 | Okabe et al. | 524/425 |
| 5,100,719 | A | * | 3/1992 | Endo et al. | 428/213 |
| 5,240,779 | A | * | 8/1993 | Ono et al. | 428/458 |
| 5,372,867 | A | * | 12/1994 | Hasegawa et al. | 428/141 |
| 5,843,578 | A | * | 12/1998 | Sasaki et al. | 428/483 |
| 6,149,204 | A | * | 11/2000 | Casper | 283/81 |
| 6,323,308 | B1 | * | 11/2001 | Kobayashi et al. | 528/354 |
| 6,372,326 | B1 | * | 4/2002 | Kosuge et al. | 428/141 |
| 6,783,825 | B1 | * | 8/2004 | Ohishi et al. | 428/35.7 |
| 6,974,620 | B1 | * | 12/2005 | Tsunekawa et al. | 428/141 |
| 2005/0106345 | A1 | * | 5/2005 | Kawahara et al. | 428/35.7 |
| 2008/0193783 | A1 | * | 8/2008 | Imai et al. | 428/480 |
| 2009/0152095 | A1 | * | 6/2009 | Kawahara et al. | 204/157.6 |

FOREIGN PATENT DOCUMENTS

| JP | 55-8551 | 3/1980 |
| JP | 55-20514 | 6/1980 |
| JP | 56-50692 | 12/1981 |

(Continued)

*Primary Examiner* — Vivian Chen
(74) *Attorney, Agent, or Firm* — Morrison & Foerster LLP

(57) ABSTRACT

An easy-to-tear biaxially-stretched polyester film having easy cut property and adhesiveness, as well as superior properties of polyester film, such as heat resistance, moisture-proof property, transparency, aroma retention and the like is provided. The polyester laminate film may include at least two layers, a layer substantially free of a molecular orientation and a layer having a molecular orientation, which shows a difference (Nx–Ny) between the refractive index Nx in the longitudinal direction and the refractive index Ny in the width direction of –0.010 to 0.010 and the refractive index Nz in the thickness direction of not less than 1.480. The layer having a molecular orientation has a thickness of 1-8 μm.

3 Claims, 1 Drawing Sheet

FOREIGN PATENT DOCUMENTS

| | | | |
|---|---|---|---|
| JP | 02-182432 | * | 7/1990 |
| JP | 04-147829 | * | 5/1992 |
| JP | 05-104618 | | 4/1993 |
| JP | 08-244189 | | 9/1996 |
| JP | 2002-337269 | | 11/2002 |
| JP | 2002-337289 | | 11/2002 |
| JP | 2002-337290 | | 11/2002 |
| JP | 2003-337289 | * | 11/2002 |
| JP | 2003-300272 | * | 10/2003 |
| JP | 2004-330476 | | 11/2004 |
| JP | 2005-178310 | | 7/2005 |

* cited by examiner (a)

(b)

(c)

EASY TEAR BIAXIALLY STRETCHED POLYESTER BASED FILM

REFERENCE TO RELATED APPLICATIONS

This application is a national stage application under 35 USC 371 of International Application No. PCT/JP2005/007917, filed Apr. 26, 2005, which claims the priority of Japanese Application No. 2004-136435, filed Apr. 30, 2004, of which the contents of both prior applications are incorporated herein by reference.

FIELD OF THE INVENTION

The present invention relates to an easy-to-tear biaxially-stretched polyester film. More particularly, the present invention relates to an easy-to-tear biaxially-stretched polyester film useful as a packaging film capable of maintaining practical property without losing the superior property such as heat resistance, aroma retention, water resistance and the like of stretched polyester films, particularly superior in adhesiveness, and having good tearability.

BACKGROUND OF THE INVENTION

Conventionally, as a film superior in cut property, cellophane is known. Cellophane has been conveniently used for various packaging materials and adhesive tapes in view of its properties such as superior transparency, easy cut property, twist property and the like. On the other hand, however, cellophane shows different properties for each season since it has hygroscopicity, and stable supply of cellophane having a constant quality is difficult. In addition, packaging bags, adhesive tapes and the like using polyethylene terephthalate as a base film have been used for their superior properties of stretched polyethylene terephthalate film such as toughness, heat resistance, water resistance, transparency and the like. Despite these superior properties, however, they are defective in that cutting is difficult, and therefore, packaging bag cannot be easily torn open, and adhesive tapes are difficult to cut, as a result of which they cannot be used for packaging and the like.

As a method to solve the above-mentioned problems, a monoaxially-oriented polyester film laminated on paper, a biaxially-oriented polyester film obtained by copolymerizing a large amount of diethylene glycol component and the like, a biaxially-oriented polyester film obtained by admixing a polyester resin having a low molecular weight, a laminate polyester film obtained by laminating, on at least one surface of polyester resin layer (A), a polyester resin mixture layer (B) having a melting point higher by not less than 10° C. than the melting point of polyester resin layer (A), which layer (B) is made of a of a terephthalic acid crystalline polyester resin (a), and a crystal segment and having a melting point of not less than 170° C. and a melting point or softening point of not more than 100° C., and the like have been proposed (see patent references 1-4).

patent reference 1: JP-B-55-8551
patent reference 2: JP-B-56-50692
patent reference 3: JP-B-55-20514
patent reference 4: JP-A-2002-337290

However, a plastic film obtained by molecular orientation in a monoaxially direction in the above-mentioned prior art is defective in that it can be linearly cut easily in the orientation direction but is difficult to cut in the direction other than the orientation direction, and a polyester film obtained by copolymerization of a large amount of a diethylene glycol component and the like is defective in that copolymerization impairs the inherent property of polyethylene terephthalate. In addition, a polyester film obtained by admixing a low molecular weight polyester resin allows easy development of troubles such as film breakage in a stretching step and is not practical.

Furthermore, a polyester film obtained using a mixture of a terephthalic acid crystalline polyester resin and a polyester block copolymer as a resin forming a surface layer has a sea-island structure wherein the polyester block copolymer is dispersed in the crystalline polyester resin. As a result, while it shows easy-to-tear property, detachment easily occurs in the interface between the crystalline polyester resin and the polyester block copolymer, and therefore, during laminate processing, interlayer cohesion becomes inferior due to the adhesion between layers, an interlayer cohesive failure occurs, and as a result, laminate strength may be degraded sometimes.

Figure 1:
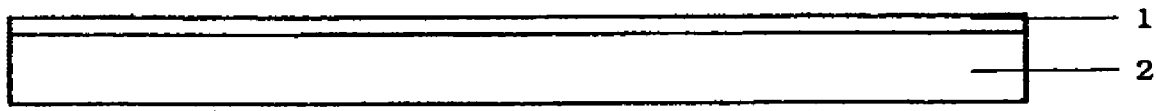
FIG. 1(a) shows one embodiment of the sectional view of the easy-to-tear biaxially-stretched polyester film of the present invention.
FIG. 1(b) shows another embodiment of the sectional view of the easy-to-tear biaxially-stretched polyester film of the present invention.
FIG. 1(c) shows still another embodiment of the sectional view of the easy-to-tear biaxially-stretched polyester film of the present invention.
Figure 1:
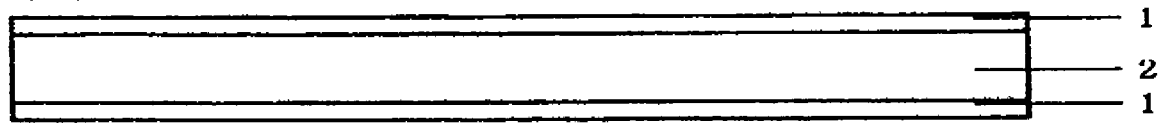
Figure 1:
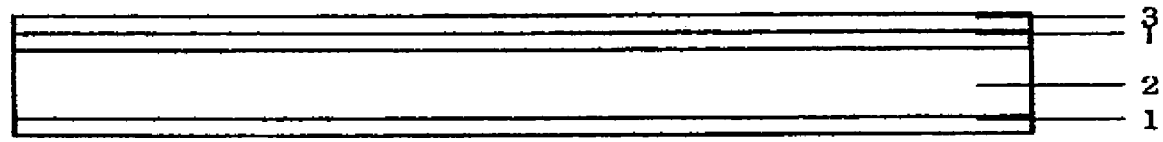

EXPLANATION OF SYMBOLS 1 layer having a molecular orientation
2 layer substantially free of a molecular orientation
3 adhesive layer

SUMMARY OF THE INVENTION

In view of the above-mentioned conventional problems, the present invention provides an easy-to-tear biaxially-stretched polyester film having easy cut property and adhesiveness, and concurrently, superior properties of polyester film such as heat resistance, moisture-proof property, transparency, aroma retention and the like.

To achieve the above-mentioned object, the easy-to-tear biaxially-stretched polyester film of the present invention is a polyester laminate film having at least two layers of a layer substantially free of a molecular orientation and a layer having a molecular orientation, which shows a difference (Nx−Ny) in the refractive index Nx in the longitudinal direction and the refractive index Ny in the width direction of −0.010 to 0.010, and the refractive index Nz in the thickness direction of not less than 1.480, wherein the layer having a molecular orientation of the polyester laminate film has a thickness of 1-8 μm.

As used herein, the refractive index is measured by an ABBE refractometer.

In this case, the layer having a molecular orientation can be laminated on both sides of the layer substantially free of a molecular orientation.

In addition, the layer having a molecular orientation desirably does not have a dispersion structure of resin.

Moreover, the layer having a molecular orientation can be made of a polyester resin containing not less than 95 mol % of terephthalic acid in aromatic dicarboxylic acid, and not less than 95 mol % of ethylene glycol in aliphatic diol.

Furthermore, an adhesive layer can be laminated on the surface of the layer having a molecular orientation of a polyester laminate film.

According to the easy-to-tear biaxially-stretched polyester film of the present invention, a laminate film having the properties inherent to a polyester film such as heat resistance, cold temperature resistance, moisture-proof property, transparency, aroma retention and the like, which is superior in tearability and adhesiveness, and shows good opening performance based on improved adhesiveness while preventing poor opening performance of a package due to the detachment of the laminate portion.

DETAILED DESCRIPTION OF THE INVENTION

The present invention is explained in detail in the following. The easy-to-tear biaxially-stretched polyester film of the present invention is a polyester laminate film comprising a layer having a molecular orientation and a layer substantially free of a molecular orientation.

As a polyester resin that forms a layer having a molecular orientation, for example, polyethylene terephthalate, polytrimethylene terephthalate, polybutylene terephthalate, polyethylene naphthalate, a copolymer comprising a constituent component thereof as a main component, and the like can be mentioned. Such polyester resin is preferably a polyester comprising terephthalic acid as a main acid component and ethylene glycol as a main alcohol component, more preferably a polyester resin comprising not less than 95 mol % of terephthalic acid and not less than 95 mol % of ethylene glycol.

Here, the layer having a molecular orientation of the laminate film in the present invention can be confirmed by the refractive index Nz in the thickness direction of the laminate film of not less than 1.480 as measured with an ABBE refractometer, which is for the following reasoning. That is, in the heat set zone after biaxial stretching, the resin layer forming the layer having a molecular orientation proceeds in crystallization, and comes to have increased refractive indices in all directions of the longitudinal direction, the transversal direction and the thickness direction, and shows a molecular orientation. In contrast, the resin layer forming the layer substantially free of a molecular orientation becomes molten in the heat set zone, thus generally eliminating the orientation in the longitudinal direction and the transversal direction, and the orientation in the thickness direction markedly increases. Therefore, only the orientation in the thickness direction becomes greater than the orientation of the layer having a molecular orientation, as a result of which the refractive index in the thickness direction shows a value of a layer having a molecular orientation. When layers having different refractive indices are laminated, an ABBE refractometer shows the refraction of a layer having the lowest refractive index in the measurement direction.

As a polyester resin forming the layer substantially free of a molecular orientation, a polyester comprising terephthalic acid and glycol as main components and other acid component and/or other glycol component as copolymerizable component(s), such as terephthalic acid-isophthalic acid-ethylene glycol copolymer, terephthalic acid-isophthalic acid-butylene glycol copolymer, terephthalic acid-ethylene glycol-neopentyl glycol copolymer and the like, is preferable, wherein the melting point thereof is preferably lower than the melting point of a polyester resin forming the layer having a molecular orientation, particularly lower by not less than 20° C. Here, as the other acid component, an aliphatic dibasic acid (e.g., adipic acid, sebacic acid, azelaic acid) and an aromatic dibasic acid (e.g., isophthalic acid, diphenyldicarboxylic acid, 5-tertiarybutylisophthalic acid, 2,2,6,6-tetramethylbiphenyl-4,4-dicarboxylic acid, 2,6-naphthalenedicarboxylic acid, 1,1,3-trimethyl-3-phenylinden-4,5-dicarboxylic acid) are used. As the other glycol component, an aliphatic diol (e.g., neopentyl glycol, diethylene glycol, trimethylene glycol, propylene glycol, butanediol, hexanediol etc.), an alicyclic diol (e.g., 1,4-cyclohexanedimethanol etc.), an aromatic diol (e.g., xylylene glycol, bis(4-β- hydroxyphenyl) sulfone, 2,2-(4-hydroxyphenyl)propane derivative) and the like are used.

In addition, it is preferable to add an elastomer component to the above-mentioned polyester resin, thereby to maintain flexibility of the layer free of a molecular orientation during processing such as printing, lamination etc. The elastomer component is not particularly limited as long as it has a second-order transition point lower than that of a polyester resin used for the layer free of a molecular orientation, and is dispersed in the polyester resin to form a sea-island structure. Specific examples thereof include low density polyethylene, linear low density polyethylene, ethylene-vinyl acetate copolymer, ethylene-vinyl alcohol copolymer, ethylene-propylene copolymer, ethylene-propylene-butene copolymer, ethylene-acrylic acid copolymer, ethylene-methyl acrylate copolymer, ethylene-ethyl acrylate copolymer, polyamide elastomers (e.g., polyamide, polyamide-polyethylene oxide block copolymer, polyamide-polytetramethylene oxide block copolymer, polyamide-polyethylene oxide block copolymer and the like), polyester block copolymer resins and the like.

As the polyester block copolymer, a polyester block copolymer made of a crystal segment having a melting point of not less than 170° C. and a soft flexible polymer having a molecular weight of 400-8000 and a melting point or softening point of not more than 100° C. is typical. The crystal segment is such a segment that forms, exclusively from the constituent components thereof, a polymer showing a melting point of not less than 170° C. For example, polyester made of a residue of aromatic dicarboxylic acid such as terephthalic acid, isophthalic acid, 2,6-naphthalenedicarboxylic acid and the like, and a residue of aliphatic, aromatic or alicyclic diol such as ethylene glycol, propylene glycol, butanediol, pentamethylene glycol, p-xylene glycol, cyclohexanedimethanol and the like, and the like can be used, and terephthalic acid residue is particularly desirably contained in a proportion of not less than 80 mol %. The soft flexible polyester having a molecular weight of 400-8000 is such a polymer as shows a melting point or softening point of 100° C. or lower when measured solely for the segment constituent component(s). As the soft flexible polymer having a low melting point, polyether such as polyethylene oxide glycol, polytetramethylene oxide glycol, polypropylene oxide glycol, copolymerized glycol of ethylene oxide and tetrahydrofuran, and the like, aliphatic polyester such as polyneopentyl azelate, polyneopentyl adipate, polyneopentyl sebacate and the like, and polylactone such as poly-ε-caprolactone and the like can be mentioned. Preferably, polyethylene oxide glycol, polytetramethylene oxide glycol and the like are practical. Specific examples of polyester block copolymer include polyethylene terephthalate-polyethylene oxide block copolymer, polyethylene terephthalate-polytetramethylene oxide block copolymer, polybutylene terephthalate-polyethylene oxide block copolymer, polybutylene terephthalate-polytetramethylene oxide block copolymer, polyethylene terephthalate-polyethylene oxide polypropylene oxide block copolymer, polytetramethylene terephthalate.isophthalate-polytetramethylene oxide block copolymer, polyethylene terephthalate-poly-ε- caprolactone block copolymer, polyethylene terephthalate-polyneopentyl sebacate block copolymer and the like can be mentioned.

Here, a layer substantially free of a molecular orientation of the laminate film in the present invention shows a difference (Nx−Ny) in the refractive index Nx in the longitudinal direction of the laminate film and the refractive index Ny in the width direction of the laminate film, as measured using an ABBE refractometer, of −0.010 to 0.010, preferably −0.005 to 0.005, more preferably −0.003 to 0.003. When the difference in the refractive index Nx in the longitudinal direction and the refractive index Ny in the width direction is less than −0.005, or not less than 0.005, the molecular orientation remains in the layer substantially free of a molecular orientation, and the expression of the tearability of the film becomes difficult. The layer substantially free of a molecular orientation comes to have the above-mentioned properties for the following reasoning. That is, in the heat set zone of the laminate film after biaxial stretching, the resin layer forming the layer having a molecular orientation proceeds with crystallization, and comes to have increased refractive indices in all directions of the longitudinal direction, the transversal direction and the thickness direction, and shows a molecular orientation. In contrast, the resin layer forming the layer substantially free of a molecular orientation becomes molten in the heat set zone, thus generally eliminating the orientation in the longitudinal direction and the transversal direction. Therefrom it is clear that a small difference between the measured Nx and Ny means that each value is small and shows the value of a layer substantially free of a molecular orientation. When layers having different refractive indices are laminated, an ABBE refractometer shows the refraction of a layer having the lowest refractive index in the measurement direction.

The intrinsic viscosity of the polyester resin constituting the polyester laminate film of the present invention is preferably 0.55-1.3 dL/g, more preferably 0.60-0.74 dL/g, and the layer having a molecular orientation and the layer substantially free of a molecular orientation are preferably layers made of two or more kinds of polyester resins selected from the resins having an intrinsic viscosity within such range.

In the present invention, layers made of two or more kinds of these polyester resins are laminated. When a multimanifold method or a feed block method is used for a lamination step and the intrinsic viscosity is markedly different between them, the flow of the resins becomes nonuniform and the uniformity in the width direction is difficult to obtain.

As the layer constitution of the polyester laminate film of the present invention, at least one of the outer layers is preferably a layer having a molecular orientation, more preferably, both outer layers are layers having a molecular orientation, in view of the film forming property such as fusion and adhesion to a roll in the longitudinal stretching step, adhesion to the tenter during breakage in the transversal stretching step and the like.

For the polyester laminate film to express good tearability and achieve stable producibility, both a layer substantially free of a molecular orientation and a layer having a molecular orientation need to be present. The level of the molecular orientation of the layer having a molecular orientation of the polyester laminate film of the present invention can be confirmed by a known method such as measurement of double refractive index, measurement of absorbance in IR analysis and the like. Conveniently, it can be evaluated by the resistance during tearing, the level of anisotropy, and the strength upon puncture with a pencil and the like.

To obtain the laminate constitution of the polyester laminate film of the present invention, a method comprising stretching an unstretched laminate film wherein layers made of two or more kinds of polyester resins having different melting points are laminated, and heat-treating same to eliminate the molecular orientation of the layer made of a resin showing the lowest melting point, thus maintaining the molecular orientation of the layer made of a resin showing a high melting point, a method comprising laminating an unstretched film to be a layer showing the lowest melting point on a stretched film to be a layer showing the highest melting point and the like can be employed.

In the present invention, the thickness of a layer having a molecular orientation is 1 μm-8 μm, more preferably 2-6 μm.

The layer having a molecular orientation of the present invention retains the physical strength of the film, and when it is less than 1 μm, the film strength cannot be maintained, and when it exceeds 8 μm, tearability is degraded.

In the polyester laminate film of the present invention, the difference (Nx−Ny) between the refractive index Nx in the longitudinal direction and the refractive index Ny in the width direction is −0.010 to 0.010, preferably −0.005 to 0.005, more preferably −0.003 to 0.003. When the difference between the refractive index Nx in the longitudinal direction and the refractive index Ny in the width direction is less than −0.010 or exceeds 0.010, the molecular orientation remains and the tearability is not expressed.

In the polyester laminate film of the present invention, the refractive index Nz in the thickness direction of the laminate film is not less than 1.480, more preferably 1.485-1.492. When Nz is less than 1.480 and when an adhesive layer is laminated on the polyester laminate film with an adhesive, the adhesion between the adhesive and the surface of the film of the present invention or the film surface of the adhesive layer of the present invention, as well as cohesion in the thickness direction of the film layer become insufficient, which in turn causes detachment and cohesive failure in the layer.

In the polyester laminate film of the present invention, an adhesive layer is practically preferably laminated on at least one of the surfaces of the layer having a molecular orientation with an adhesive. In this event, a layer having a molecular orientation is preferably laminated on the surface on the opposite side. While such adhesive layer is not particularly limited, it is generally unstretched film. A resin constituting such layer is preferably selected from polyolefin resin such as low density polyethylene (LDPE), polypropylene, ethylene propylene copolymer, linear low density polyethylene (LLDPE) and the like. In addition, the adhesive layer may be formed on the surface of the polyester laminate film by extrusion laminate method, that is, by melt extruding a resin constituting the adhesive layer, or by any method such as lamination of an adhesive layer film by dry laminate method and the like.

In the present invention, the refractive index of the film is measured using an ABBE refractometer. When layers having different refractive indices are laminated, an ABBE refractometer shows the refraction of the layer having the lowest refractive index in the measurement direction.

Accordingly, when the laminate of the layer substantially free of a molecular orientation and the layer having a molecular orientation of the present invention is measured, the measurement values Nx and Ny in the longitudinal and transverse directions show the refractive index of the layer substantially free of a molecular orientation. In addition, the refractive index Nz in the thickness direction shows the refractive index of the layer having a molecular orientation.

This is explained based on the relationship between the production steps of the present invention. That is, in the stretching step for production of the polyester laminate film, all layers are oriented in the longitudinal direction and the transverse direction, and the orientation in the thickness direction is markedly decreased.

Then, in the heat set zone, the resin layer forming the layer having a molecular orientation proceeds in crystallization, and comes to have increased refractive indices in all directions of the longitudinal direction, the transversal direction and the thickness direction, and has a molecular orientation. However, the resin layer forming the layer substantially free of a molecular orientation becomes molten in the heat set zone, thus generally eliminating the orientation in the longitudinal direction and the transversal direction, and the orientation in the thickness direction markedly increases, thus leading to a greater orientation in the thickness direction alone than that of the layer having a molecular orientation. As a result, the refractive index in the thickness direction shows the value of the layer having a molecular orientation.

By the measurement using an ABBE refractometer in this way, deterioration of the molecular orientation of the layer substantially free of a molecular orientation, which becomes the index of easy-to-tear property, and the crystallinity of the layer having a molecular orientation, which becomes the index of the adhesiveness can be measured.

In the polyester laminate film of the present invention, thickness of the layer having a molecular orientation of the polyester laminate film is 1-8 μm, the difference (Nx–Ny) between the refractive index Nx in the longitudinal direction and the refractive index Ny in the width direction is –0.010 to 0.010, the refractive index Nz in the thickness direction is not less than 1.480. When these ranges are not met, the laminate film has greater strength and unpreferably cannot be easily torn with hands.

The difference (Nx–Ny) between the refractive index Nx in the longitudinal direction and the refractive index Ny in the width direction of –0.010 to 0.010, and the refractive index Nz in the thickness direction of not less than 1.480, of the polyester laminate film of the present invention, can be achieved by adjusting the ratio of layer thickness of the aforementioned layer substantially free of a molecular orientation and the layer having a molecular orientation, the degree of disappearance of molecular orientation of the layer free of a molecular orientation, the resin composition ratio of polyester resins of the layer having a molecular orientation and thickness thereof and the like.

The degree of orientation of the layer substantially free of a molecular orientation only needs to be lower than that of the layer having a molecular orientation, where strict control of the degree of disappearance of the molecular orientation is not practical.

In the polyester laminate film of the present invention, to improve printability of the layer having a molecular orientation, a small amount of a resin incompatible with the polyester resin that forms the layer free of a molecular orientation, for example, polyolefin, polyamide, polybutene terephthalate-polytetramethylene glycol copolymer and the like, can be added. When a sealant film and the like are laminated as an adhesive layer on the layer having a molecular orientation, however, it should be considered that, even though the adhesion between the layer having a molecular orientation and the adhesive that adheres to the adhesive layer is strong, since the cohesion in the interface between the polyester resin that forms the layer having a molecular orientation and the incompatible resin is markedly small, a cohesive failure occurs in the layer having a molecular orientation, which in turn may produce a film with a small laminate strength. Accordingly, it is preferable that the layer having a molecular orientation does not have a dispersion structure, i.e., a dispersed sea-island structure, even when the incompatible resin, such as polyolefin, polyamide, polybutene terephthalate-polytetramethylene glycol copolymer and the like, is added in a small amount. As a result, detachment does not occur easily in the interface between the polyester resin and the incompatible resin, cohesion in the layer does not become inferior to the adhesion between layers after laminate processing, and cohesive failure does not occur in the layer. Accordingly, the laminate strength is not degraded.

In addition, the thickness of the polyester laminate film of the present invention is about 10-30μ, which is not particularly limited, for use as a packaging bag, the main use of the present invention film, and the like. The thickness of the layer substantially having a molecular orientation is 1-8 μm, which can be freely changed according to the desired tearability. When the thickness of the layer substantially having a molecular orientation is less than 1 μm, the strength of the film becomes too low, which in turn may cause breakage during film forming or during processing such as printing, lamination and the like. When it exceeds 8 μm, the easy-to-tear property becomes impractically markedly impaired.

The polyester laminate film of the present invention may contain various known additives, such as lubricant, pigment, antioxidant, antistatic agent and the like, as long as the effect of the present invention is not inhibited.

One embodiment of the production method of the polyester laminate film of the present invention is explained in the following.

Two kinds of vacuum-dried polyester resins having different melting points are supplied to two separate extruders, melt-extruded at a temperature not less than the melting point of each polyester resin, passed through a composite adapter, extruded as a 2-kind 3-layer (high melting point/low melting point/high melting point) laminate from a spinneret, and cool-solidified to give an unstretched laminate film.

The thus-obtained unstretched laminate film is stretched 2- to 4-fold in the longitudinal direction at a temperature of secondary transition point of polyester resin on the high melting point side—secondary transition point+30° C., and immediately cooled to 20-40° C.

Then, the film is stretched 3- to 4.5-fold in the transverse direction at a temperature of the longitudinal direction elongation temperature +10-+40° C.

The thus-obtained biaxially stretched film is heat treated at a temperature at which the layer made of the polyester resin on the low melting point side melts, and lower than the melting point of the layer made of the polyester resin on the high melting point side. More preferably, it is not less than 2° C. plus the melting point of the layer made of the polyester resin on the low melting point side, and not more than 10° C. lower than the melting point of the layer made of the polyester resin on the high melting point side. That is, since the degree of deterioration of orientation changes strikingly at around its melting point, to stabilize the property, the temperature is preferably not less than 2° C. plus the melting point of the layer made of the polyester resin on the low melting point side, and since the orientation is relaxed on the high melting point layer side near the melting point of the layer made of the polyester resin on the high melting point side, like the low melting point layer, the film forming property becomes unstable. In this heat treatment, a relaxation treatment may be applied as necessary.

By selecting such heat treatment conditions, a film showing the difference (Nx–Ny) between the refractive index Nx in the longitudinal direction and the refractive index Ny in the width direction of −0.010 to 0.010, and the refractive index Nz in the thickness direction of not less than 1.48, which are elements of the polyester laminate film of the present invention, can be obtained.

As mentioned above, the polyester laminate film of the present invention is advantageous in that the object film property can be set in a wide range by balancing the layer that confers easy-to-tear property, wherein the molecular orientation has been nearly deteriorated due to the heat treatment in the film forming step, and the layer showing easy-to-tear property while maintaining the molecular orientation and the property inherent to polyester, as well as breakage trouble and the like during film forming can also be prevented by the presence of the layer having a molecular orientation.

As mentioned above, the present invention is advantageous in that the object film property can be freely set by balancing the layer that confers easy-to-tear property, wherein the molecular orientation has been nearly deteriorated due to the heat treatment in the film forming line, and the layer showing easy-to-tear property while maintaining the molecular orientation and the property inherent to polyester, as well as breakage trouble and the like during film forming can also be prevented by the presence of the layer maintaining the molecular orientation.

In the present invention, a film superior in production and processing and having superior tearability can be obtained by setting the thickness of the layer having a molecular orientation to 1-8 μm and the difference (Nx−Ny) between the refractive index Nx in the longitudinal direction and the refractive index Ny in the width direction to −0.010 to 0.010.

Moreover, the refractive index Nz in the thickness direction is preferably set to not less than 1.480, further 1.485-1.492. When the Nz is less than 1.48 and when other film layer is laminated on the polyester laminate film with an adhesive, the adhesion between the adhesive and the surface of the polyester laminate film of the present invention or the surface of other film layer, as well as cohesion in the thickness direction of the polyester laminate film of the present invention become insufficient, which in turn causes detachment and cohesive failure in the layer.

EXAMPLES

The present invention is specifically explained by way of Examples and Comparative Examples. The property values in the present invention were evaluated by the following.
(1) Secondary Transition Point, Melting Point Using a differential scanning calorimeter manufactured by Shimadzu Corporation, DSC-60, a sample (about 5 mg) was prepared and measured from 30° C. to 280° C. at a temperature rise rate of 20° C./min. For the secondary transition point (Tg), the tangential intersection of displacement was measured and, for the melting point (Tm), the peak temperature of the melting peak was measured.
(2) Refractive Index The refractive indices Nx, Ny and Nz in the longitudinal direction, width direction and thickness direction were measured according to JIS-K7105 under an atmosphere of 23° C. and using an ABBE refractive index meter.
(3) Confirmation of Dispersion Structure A sample was cut out in the longitudinal direction (10 mm) and the width direction (5 mm), and the film was embedded in an epoxy resin. Using a microtome in the width direction of the film, trimming and surface forming were performed. The epoxy block with the formed surface was placed in $RuO_4$ vapor, and stained for 16 hr. An ultra-thin section was obtained from the block, placed on a mesh for transmission electron microscopic observation, and subjected to carbon vapor deposition to give a sample for observation. For observation, the presence of the dispersion structure of a layer having a molecular orientation in the film was confirmed using a transmission electron microscopic (JEM2010, manufactured by JEOL Ltd., 50000 magnifications). The evaluation was based on the following.

○: dispersion structure cannot be confirmed
x: dispersion structure is present
(4) Laminate Strength
(a): Preparation of Sample A two-liquid curing type polyester adhesive (TM590, manufactured by Toyo-Morton, Ltd.) and a curing agent (CAT56, manufactured by Toyo-Morton, Ltd.) for two-liquid curing type polyester adhesive were applied to achieve a solid content of 3 $g/m^2$, the film was adhered to a sealant at 60° C., cured at 40° C. for 48 hr and measured. As a sealant, an LLDPE film (40 μm, L6102 manufactured by TOYOBO CO., LTD.) was used.
(b): Measurement:

A sample (longitudinal direction 200 mm, width direction 15 mm) was cut out, using an autograph manufactured by Shimadzu Corporation, the sample was peeled off to form a T-shape at 200 mm/min, and the strength then was measured. Each sample was measured 5 times and the average was taken. The highest value and the lowest value were excluded and the average of 3 points was determined.
(c): Evaluation The laminate strength was evaluated in the following three levels.

○: not less than 2 N/15 mm
Δ: not less than 1 N/15 mm, less than 2 N/15 mm
x: less than 1 N/15 mm
(5) Easy-to-Tear Property A sensory test was employed. An aluminum foil (9 μm) was laminated via an adhesive on a laminate film obtained in each example, LDPE was melt-extruded on the aluminum foil side and laminated (15 μm) thereon to give a laminate. Then, a bag was made (longitudinal direction/width direction=15/10 cm) by a heat sealing method, and opening performance was evaluated by cutting the sealed part with hands. When the terminal portion of the bag was held with both hands, about 3 mm distance was secured, where the evaluation was performed for both the longitudinal direction and the width direction of the film.

○: easily opened without using the nail
Δ: easily opened using the nail
x: cannot be opened easily even using the nail Example 1

For an intermediate layer, a resin composition comprising (1) 97 wt % of a polyester resin comprising terephthalic acid-isophthalic acid-ethylene glycol and having secondary transition point 72° C., melting point 225° C., intrinsic viscosity 0.64 dL/g, and (2) 3 wt % of a polyester elastomer comprising terephthalic acid-ethylene glycol-polytetramethylene glycol and having secondary transition point −80° C., melting point 170° C., intrinsic viscosity 0.76 dL/g was used. For outer layer a and outer layer b, a polyester resin comprising terephthalic acid-ethylene glycol and having secondary transition point 75° C., melting point 265° C., intrinsic viscosity 0.62 dL/g was used.

Each polyester resin was melted in a separate extruder at 285° C., the melt polymers were joined in a composite adapter, extruded from a T die, rapidly cooled in a cooling drum adjusted to 20° C. to give an unstretched laminate film of a three-layer structure (outer layer a/intermediate layer/outer layer b).

The unstretched laminate film was stretched 3.8-fold in the longitudinal direction at 100° C. and then 4.2-fold in the transverse direction at 110° C., heat treated at 230° C. while relaxing at 2.5%, and a laminate film with total thickness of 16.0 μm, wherein the total thickness of the both outer layers was 3.0 μm. The properties are shown in Table 1.

Example 2

Using the same starting material and method as in Example 1 and changing the total thickness of the both outer layers to 6.0 μm, a laminate film having a total thickness of 16.0 μm was obtained. The properties of the obtained film are shown in Table 1.

Comparative Example 1

Using the same starting material and method as in Example 1 and changing the total thickness of the both outer layers to 12.0 μm, a laminate film having a total thickness of 16.0 μm was obtained. The properties of the obtained film are shown in Table 1.

Comparative Example 2

In the same manner as in Example 1 except that, for an intermediate layer of Example 1, a resin composition comprising 97 wt % of a polyester resin comprising terephthalic acid-isophthalic acid-ethylene glycol and having secondary transition point 73° C., melting point 245° C., intrinsic viscosity 0.64 dL/g, and 3 wt % of a polyester elastomer comprising terephthalic acid-ethylene glycol-polytetramethylene glycol and having secondary transition point −80° C., melting point 170° C., intrinsic viscosity 0.76 dL/g was used, and a heat treatment was performed at 230° C., a laminate film having a total thickness of 16.0 μm was obtained. The properties of the obtained film are shown in Table 1.

Comparative Example 3

In the same manner as in Example 1 except that, for an intermediate layer of the film of Example 1, a resin composition comprising 97 wt % of a polyester resin comprising terephthalic acid-isophthalic acid-ethylene glycol and having secondary transition point 71° C., melting point 215° C., intrinsic viscosity 0.62 dL/g, and 3 wt % of a polyester elastomer comprising terephthalic acid-ethylene glycol-polytetramethylene glycol and having secondary transition point −80° C., melting point 170° C., intrinsic viscosity 0.76 dL/g was used, and a heat treatment was performed at 210° C., a film having a total thickness of 16.0 μm was obtained. The properties of the obtained film are shown in Table 1.

Comparative Example 4

In the same manner as in Example 1 except that a mixture of a polyester resin and 3 wt % of a polyethylene terephthalate-polytetramethylene glycol copolymer comprising terephthalic acid (100 mol %) as a dicarboxylic acid component, and butanediol (85 mol %) and 15 mol % of polytetramethylene glycol having a molecular weight of 1000 as a diol component, was used as both outer layers of Example 1, a film having a total thickness of 16.0 μm was obtained. The properties of the obtained film are shown in Table 1.

TABLE 1

| | | Ex. 1 | Ex. 2 | Com. Ex. 1 | Com. Ex. 2 | Com. Ex. 3 | Com. Ex. 4 |
|---|---|---|---|---|---|---|---|
| intermediate layer | melting point (° C.) | 225 | 225 | 225 | 245 | 205 | 225 |
| | thickness (μm) | 13.0 | 10.0 | 4.0 | 13.0 | 13.0 | 13.0 |
| outer layer a | melting point (° C.) | 255 | 255 | 255 | 255 | 255 | 255 |
| | thickness (μm) | 1.5 | 3.0 | 6.0 | 1.5 | 1.5 | 1.5 |
| outer layer b | melting point (° C.) | 255 | 255 | 255 | 255 | 255 | 255 |
| | thickness (μm) | 1.5 | 3.0 | 6.0 | 1.5 | 1.5 | 1.5 |
| outer layer thickness (μm) | | 3.0 | 6.0 | 12.0 | 3.0 | 3.0 | 3.0 |
| heat set temperature (° C.) | | 230 | 230 | 230 | 230 | 210 | 230 |
| refractive index | Nx | 1.5743 | 1.5743 | 1.5743 | 1.6247 | 1.5744 | 1.5743 |
| | Ny | 1.5743 | 1.5742 | 1.5744 | 1.6588 | 1.5744 | 1.5743 |
| | Nx − Ny | 0 | 0.0001 | −0.0001 | −0.0341 | 0 | 0 |
| | Nz | 1.4852 | 1.4864 | 1.4866 | 1.4884 | 1.4790 | 1.4850 |
| dispersion structure | | ○ | ○ | ○ | ○ | ○ | X |
| laminate strength (N/15 mm) | | ○ | ○ | ○ | ○ | X | X |
| tearability | length direction | ○ | ○ | X | X | ○ | ○ |
| | width direction | ○ | ○ | X | X | ○ | ○ |

While the easy-to-tear biaxially-stretched polyester film of the present invention has been explained based on plural Examples in the above, the present invention is not limited to the constitution described in the above-mentioned Examples, and the constitution can be appropriately modified without departing from the subject matter thereof, such as appropriate combination of the constitution described in each Example and the like.

Since the easy-to-tear biaxially-stretched polyester film of the present invention is superior in tearability and adhesiveness, it can be preferably used as a packaging film and an adhesive tape, as well as, for example, the portion of the opening of PTP packaging and beverage packs.

The invention claimed is:

1. A biaxially-stretched polyester laminate film comprising at least three layers, comprising:
   a layer substantially free of a molecular orientation and layers having a molecular orientation laminated on both sides of the layer substantially free of a molecular orientation,
   the layers having a molecular orientation showing a difference (Nx−Ny) between the refractive index Nx in the longitudinal direction and the refractive index Ny in the width direction of −0.010 to 0.010 and the refractive index Nz in the thickness direction of 1.480 to 1.492 and having a thickness of 1-8 μm,
   wherein the layer substantially free of a molecular orientation comprises an elastomeric component dispersed in a polyester resin to form a sea-island structure, and
   wherein at least one of the layers having a molecular orientation does not have a dispersion structure and has an adhesive layer laminated on an exposed surface side thereof.

2. The biaxially-stretched polyester film of claim 1, wherein the layers having a molecular orientation are made of a polyester resin comprising not less than 95 mol % of terephthalic acid in an aromatic dicarboxylic acid, and not less than 95 mol % of ethylene glycol in aliphatic diol.

3. The biaxially-stretched polyester film of claim 1, wherein the layers having a molecular orientation comprise a polyester resin selected from the group consisting of a terephthalic acid-isophthalic acid-ethylene glycol copolymer, a terephthalic acid-isophthalic acid-butylene glycol copolymer and a terephthalic acid-ethylene glycol-neopentyl glycol copolymer.

* * * * *

UNITED STATES PATENT AND TRADEMARK OFFICE
CERTIFICATE OF CORRECTION

PATENT NO. : 7,943,230 B2  
APPLICATION NO. : 11/579068  
DATED : May 17, 2011  
INVENTOR(S) : Kazumoto Imai et al.

Page 1 of 1

It is certified that error appears in the above-identified patent and that said Letters Patent is hereby corrected as shown below:

Title Page, Item (87) PCT Pub No.:

Please replace "WO2005/015440" with --WO2005/105440--.

Signed and Sealed this
Eleventh Day of October, 2011

David J. Kappos
*Director of the United States Patent and Trademark Office*